United States Patent
Xu et al.

(10) Patent No.: US 8,217,553 B2
(45) Date of Patent: Jul. 10, 2012

(54) REDUCED-VOLTAGE, LINEAR MOTOR SYSTEMS AND METHODS THEREOF

(75) Inventors: Qin Xu, West Henrietta, NY (US); David Henderson, Farmington, NY (US); Daniele Piazza, Rochester, NY (US)

(73) Assignee: New Scale Technologies, Victor, NY (US)

( * ) Notice: Subject to any disclaimer, the term of this patent is extended or adjusted under 35 U.S.C. 154(b) by 0 days.

(21) Appl. No.: 12/228,923

(22) Filed: Aug. 18, 2008

(65) Prior Publication Data

US 2010/0039715 A1    Feb. 18, 2010

(51) Int. Cl.
    *H01L 41/08*    (2006.01)
(52) U.S. Cl. ............. 310/323.02; 310/358; 310/317
(58) Field of Classification Search ............. 310/323.02
    See application file for complete search history.

(56) References Cited

U.S. PATENT DOCUMENTS

| | | | |
|---|---|---|---|
| 2,439,499 A | 4/1948 | Williams et al. | |
| 4,456,394 A * | 6/1984 | Kolm et al. | 400/124.16 |
| 4,523,121 A | 6/1985 | Takahashi et al. | |
| 4,812,698 A * | 3/1989 | Chida et al. | 310/330 |
| 6,066,911 A * | 5/2000 | Lindemann et al. | 310/323.02 |
| 6,249,093 B1 * | 6/2001 | Takahata et al. | 318/129 |
| 6,300,692 B1 * | 10/2001 | Joyce | 310/26 |
| 6,836,056 B2 | 12/2004 | Oudshoorn et al. | |
| 6,940,209 B2 * | 9/2005 | Henderson | 310/323.02 |
| 7,026,745 B2 | 4/2006 | Dames | |
| 7,099,093 B2 | 8/2006 | Jeong et al. | |
| 7,170,214 B2 * | 1/2007 | Henderson et al. | 310/323.02 |
| 7,298,564 B2 * | 11/2007 | Rouvinen et al. | 359/824 |
| 7,309,943 B2 | 12/2007 | Henderson et al. | |
| 7,309,945 B2 * | 12/2007 | Iwase et al. | 310/328 |
| 7,339,306 B2 * | 3/2008 | Henderson | 310/323.02 |
| 7,355,802 B2 * | 4/2008 | Homme | 359/824 |
| 2002/0038986 A1 | 4/2002 | Magnussen et al. | |
| 2008/0174889 A1 | 7/2008 | Su et al. | |

OTHER PUBLICATIONS

Uchino et al., "Micromechatronics," Ceramic Actuator Structures and Fabrication Methods, Chapter 4, Marcel Dekker, Inc., New York, pp. 178-218 (2003).
International Search Report for International Patent Application No. PCT/US2009/054159 (Oct. 1, 2009).

* cited by examiner

*Primary Examiner* — Mark Budd
(74) *Attorney, Agent, or Firm* — LeClairRyan, a Professional Corporation (57) ABSTRACT

A linear motor system includes an element with a threaded passage, a threaded shaft, and a driving system. The threaded shaft has an axis of rotation which extends through and is at least partially engaged with at least a portion of the threaded passage. The driving system comprises at least two members operatively connected to the element. Each of the two members comprises two or more piezoelectric layers and electrodes which are coupled to opposing surfaces of each of the piezoelectric layers. The members are configured to expand and contract in a direction along the axis of rotation. The driving system is configured to subject the element to vibrations causing the threaded shaft to simultaneously rotate and translate in the direction along the axis of rotation through the element and apply an axial force in the direction along the axis of rotation.

30 Claims, 9 Drawing Sheets

| Member Designation | Electrode Polarity (137) | "L" Shaped Electrode Designation | Electrical Trace Designation | Electrical Signal Designation |
|---|---|---|---|---|
| 132a | Positive | 134a | 144c | 470a |
| 132a | Negative | 136a | 144d | 470b |
| 132b | Positive | 134b | 144b | 470c |
| 132b | Negative | 136b | 144a | 470d |
| 132c | Positive | 134c | 144d | 470b |
| 132c | Negative | 136c | 144c | 470a |
| 132d | Positive | 134d | 144a | 470d |
| 132d | Negative | 136d | 144b | 470c |

REDUCED-VOLTAGE, LINEAR MOTOR SYSTEMS AND METHODS THEREOF

FIELD OF THE INVENTION

The present invention generally relates to motor systems and methods thereof and, more particularly, relates to reduced-voltage, linear motor systems and methods thereof.

BACKGROUND

Transducers using piezoelectric technologies are used for precise positioning at the nanometer scale. Typically, piezoelectric devices include a ceramic that is formed into a capacitor that changes shape when charged and discharged. These piezoelectric devices can be used as position actuators because of their shape changing properties (i.e., vibrations). When such a piezoelectric device is used as a position actuator, the shape change of the ceramic is approximately proportional to an applied voltage differential across the ceramic.

Linear motors use piezoelectric generated vibrations to create continuous movement of a threaded shaft with high speed, high torque, small size, and quiet operation. An exemplary prior art linear motor includes a cylinder that supports a threaded element or nut. The cylinder includes four symmetrically positioned piezoelectric transducers to simultaneous excite the orthogonal bending modes of the cylinder at the first bending mode resonant frequency in the ultrasonic range with a plus or minus ninety-degree phase shift to generate a circular orbit. The threaded element orbits the centerline of the cylinder at the resonant frequency, which generates torque that rotates the threaded shaft that moves the threaded shaft linearly.

This linear motor typically operates at about 40 volts. However, optical systems in cell phones, cameras, or the like typically only include about a 3 volt battery. These devices simply cannot supply enough voltage to cause the motor to operate as intended without using a transformer or a DC-DC boost circuit to increase and/or step-up the voltage. The transformer adds extra circuitry, bulk, weight, and extra cost to, for example, a cell phone camera.

SUMMARY

A linear motor system in accordance with embodiments of the present disclosure includes an element with a threaded passage, a threaded shaft, and a driving system. The threaded shaft has an axis of rotation which extends through and is at least partially engaged with at least a portion of the threaded passage. The driving system comprises at least two members operatively connected to the element. Each of the two members comprises two or more piezoelectric layers and electrodes which are coupled to opposing surfaces of each of the piezoelectric layers. The members are configured to expand and contract in a direction along the axis of rotation. The driving system is configured to subject the element to vibrations causing the threaded shaft to simultaneously rotate and translate in the direction along the axis of rotation through the element and apply an axial force in the direction along the axis of rotation.

An optical lens assembly in accordance with other embodiments of the present disclosure includes a linear motor system and an optical lens. The linear motor system comprises an element with a threaded passage, a threaded shaft, and a driving system. The threaded shaft has an axis of rotation which extends through and is at least partially engaged with at least a portion of the threaded passage. The driving system comprises at least two members that subject the element to vibrations causing the threaded shaft to simultaneously rotate and translate in a direction along the axis of rotation through the element and apply an axial force in the direction along the axis of rotation. Each of the at least two members comprises two or more piezoelectric layers which are configured to expand and contract in the direction along the axis of rotation. The optical lens is coupled to the linear motor system. The linear motor system is configured to move the optical lens in a direction substantially parallel with the direction along the axis of rotation.

A method for driving a load in accordance with other embodiments of the present disclosure includes operatively connecting a load to a threaded shaft which has an axis of rotation and which extends through and is at least partially engaged with at least a portion of a threaded passage in an element. Subjecting at least two members which are configured to expand and contract in the direction along the axis of rotation and which are connected to the element to vibrations causing the threaded shaft to simultaneously rotate and translate in a direction along an axis of rotation through the element which moves the load. Each of the two members comprise two or more piezoelectric layers and electrodes which are coupled to opposing surfaces of each of the piezoelectric layers.

A method for making a linear motor in accordance with other embodiments of the present disclosure includes at least partially engaging a threaded shaft with an axis of rotation in a threaded passage in an element. Connecting at least two members of a driving system to the element. Each of the two members comprises two or more piezoelectric layers and electrodes, which are coupled to opposing surfaces of each of the piezoelectric layers. Each of the piezoelectric layers is configured to expand and contract in a direction along the axis of rotation. The driving system is configured to subject the element to vibrations causing the threaded shaft to simultaneously rotate and translate in the direction along the axis of rotation through the element and apply an axial force in the direction along the axis of rotation.

The present disclosure provides a number of advantages including providing a more efficient and a more compact linear motor system. The linear motor system can directly operate on about 2.8 volts without using a DC-DC booster circuit and/or a transformer. The linear motor system can be used to move a variety of different loads in a variety of different applications, such as in auto-focus systems and auto-zoom systems in cameras by way of example only.

DETAILED DESCRIPTION

Figure 1A:
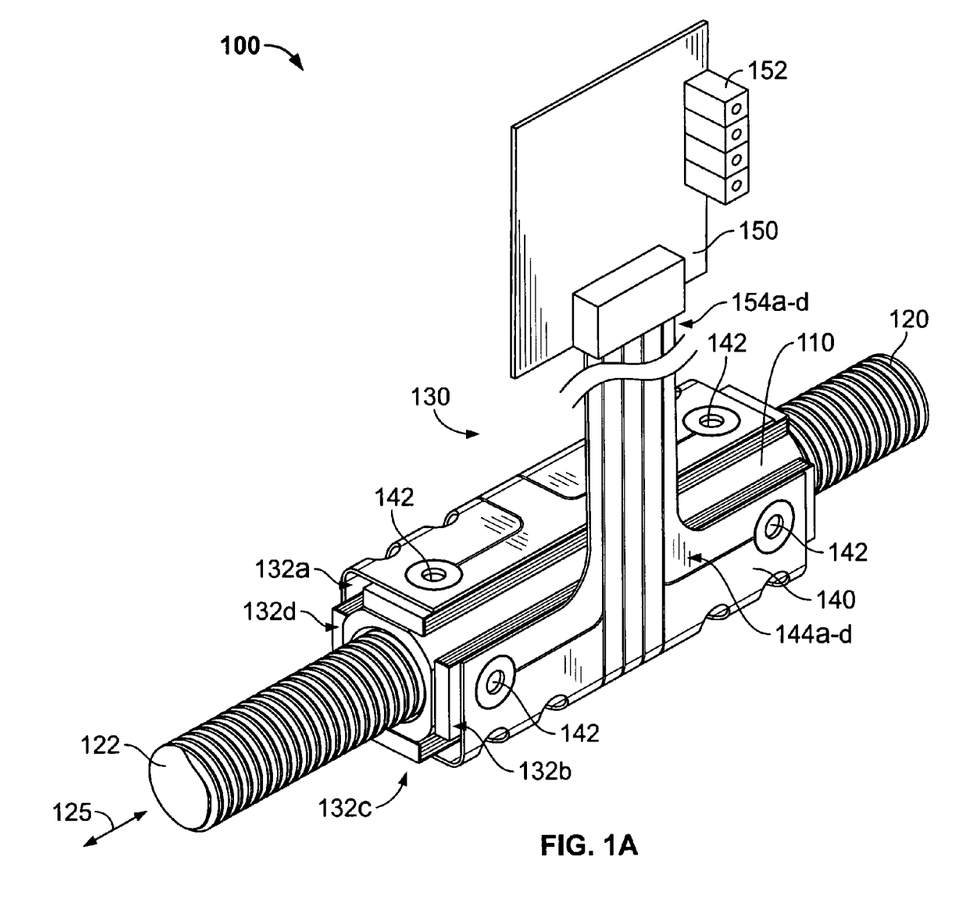
FIG. 1A is a perspective view of a linear motor system in accordance with embodiments of the present disclosure.
Figure 1B:
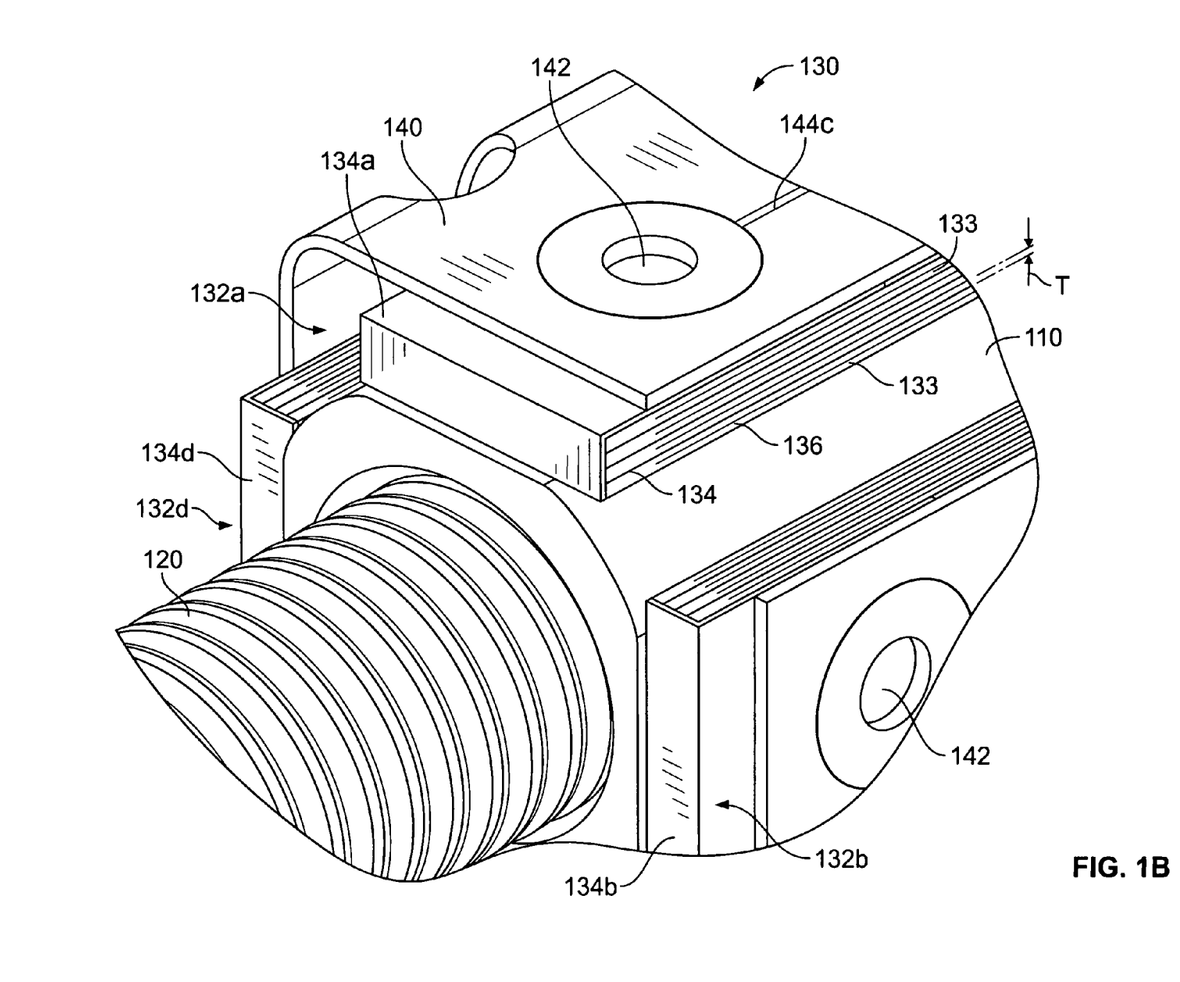
FIG. 1B is a partial zoomed-in view of a driving system of the linear motor system illustrated in FIG. 1A.
Figure 2:
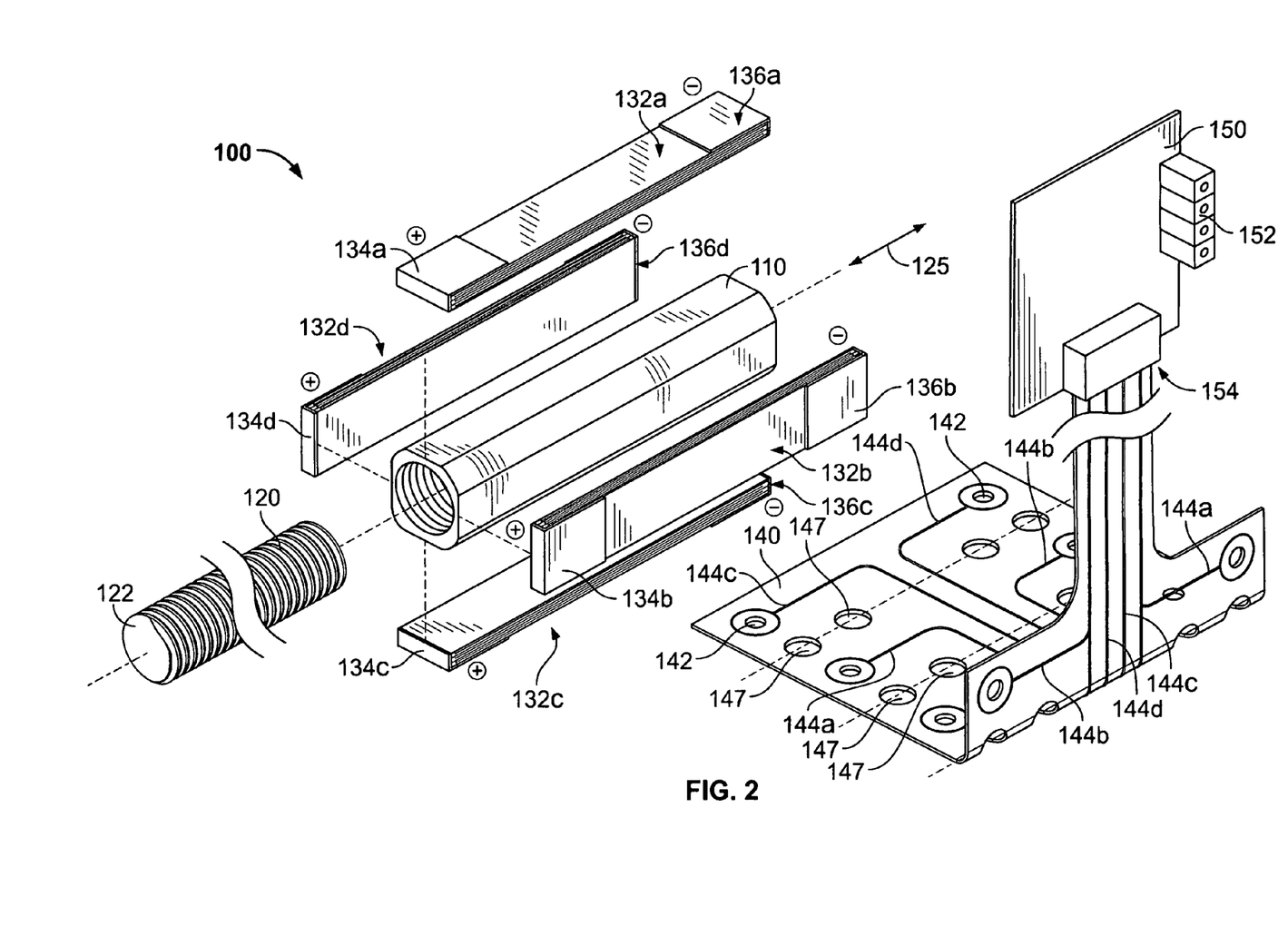
FIG. 2 is an exploded perspective view of the linear motor system of FIG. 1A.

A linear motor system 100 in accordance with embodiments of the present disclosure is illustrated in FIGS. 1A-1B and 2. The linear motor system 100 includes an element 110 with a threaded passage, a threaded shaft 120, and a driving system 130. The linear motor system 100 can include other types and numbers of systems, devices, and components which are connected in other manners. The present disclosure provides a more compact and efficient linear motor system.

Referring to FIG. 1A, the linear motor system 100 generates a force to move a load (e.g., an optical lens) in a linear direction. It is contemplated that the linear motor system 100 can move other types of loads in other directions. The inner passage of the element 110 can be partially threaded or threaded throughout. The threaded shaft 120 has an axis of rotation 125 about which the threaded shaft 120 rotates. The threaded shaft 120 also translates in a direction along the axis of rotation 125. In some embodiments, the threaded shaft 120 includes at least one rounded end 122. The rounded end 122 reduces frictional forces and aids in applying the force to move the load.

According to some embodiments, the driving system 130 comprises four members 132a-d, a flex circuit 140, and a full bridge drive system 150. It is contemplated that the driving system 130 can comprise other numbers and types of structures. Each member 132a-d is configured to change length upon being subjected to a voltage differential across its thickness T (shown in FIG. 2). Specifically, the members 132a-d can expand and/or contract in the direction along the axis of rotation 125 of the threaded shaft 120. Each of the members 132a-d comprise two or more piezoelectric layers. In some embodiments, the members 132a-d comprise between about 5 piezoelectric layers and about 25 piezoelectric layers. In some embodiments, the members 132a-d comprise about 13 piezoelectric layers.

Figure 3:
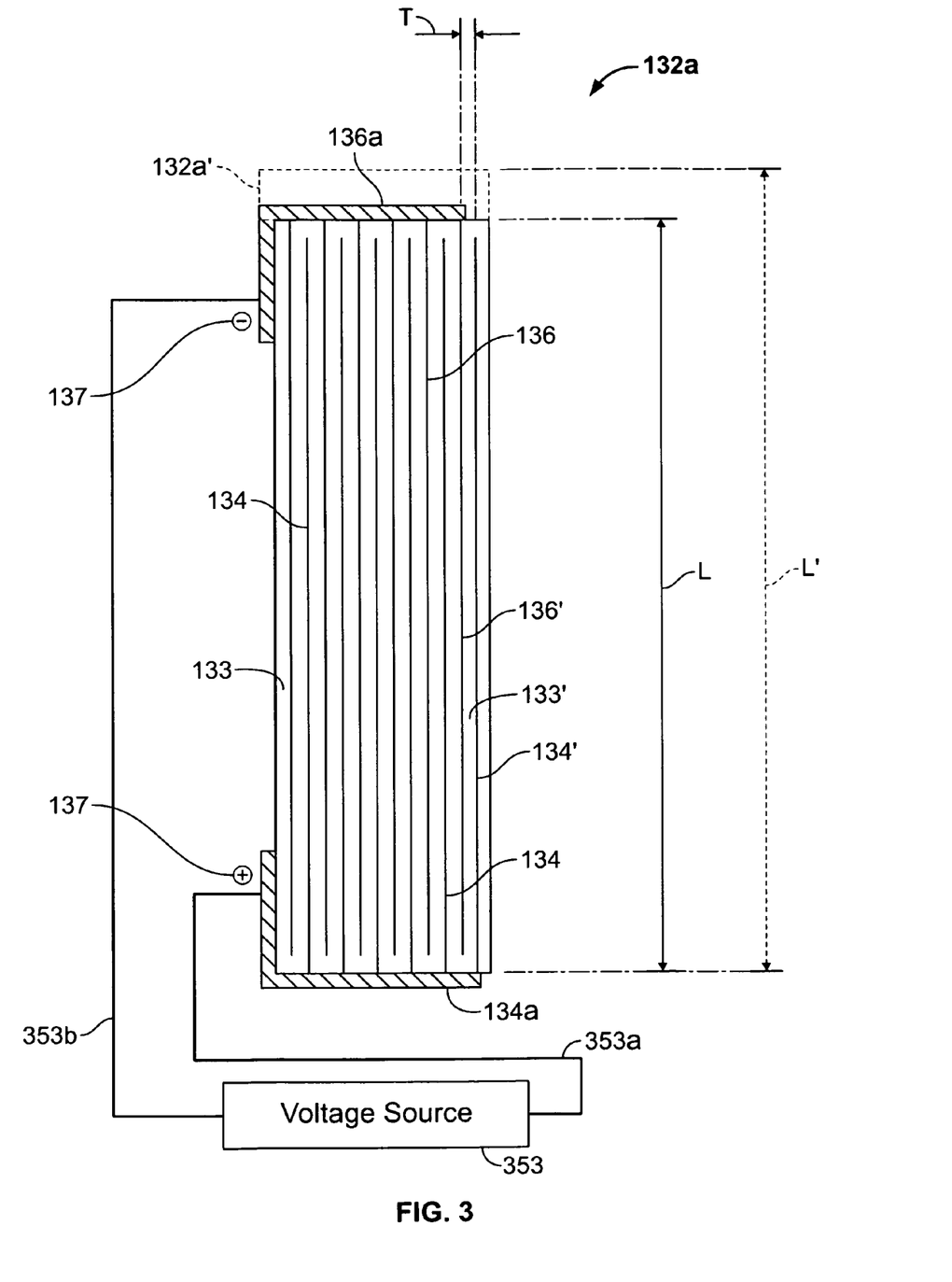
FIG. 3 is a cross-sectional side view of a member of the driving system of FIG. 1B.

Each of the piezoelectric layers have a pair of electrodes coupled to opposing surfaces. Examples of the orientation and arrangement of the piezoelectric layers and the electrodes are best seen in FIGS. 1B and 3, which are both discussed in detail below. Referring back to FIG. 1A, the members 132a-d are each made from ceramic material and are co-fired with internal conductive electrodes into a multi-layered piezoelectric transducer in the shape of a plate. In some embodiments, it is contemplated that other types and shapes of piezoelectric materials and other manners for forming the members 132a-d are possible.

The flex circuit 140 can also be referred to as an electrical coupler. The flex circuit 140 electrically couples the electrodes positioned between each piezoelectric layer with the full bridge drive system 150. The flex circuit 140 is configured to be bent and/or wrapped around the element 110 such that electrical terminals 142 align with and electrically couple to "L" shaped electrodes 134a-d and 136a-d (shown in FIG. 2) on the members 132a-d. The flex circuit 140 comprises at least four electrical traces 144a-d that carry at least four different electrical signals 470A-D (shown in FIG. 4) to the various electrical terminals 142.

The full bridge drive system 150 comprises a voltage source 461 and has four signal outputs 154a-d, which provide square-wave voltage signals. It is contemplated that other types and numbers of voltage signals, driving circuits, and systems with more or less outputs can be used. Each of the four signal outputs 154a-d electrically connect to a respective electrical trace 144a-d to distribute one of the square-wave voltage signals via the flex circuit 140. The full bridge drive system 150 effectively doubles the voltage differential across each piezoelectric layer in each of the members 132a-d and doubles the mechanical output as compared with a half bridge circuit. Using such a full bridge drive system can reduce a system's input voltage and power requirements, although other types of systems, such as a half bridge circuit system, can still be used. Because the components and operation of full bridge drive systems are well known to those of ordinary skill in the art they will not be described in detail herein.

Referring to FIG. 1B, a partial zoomed-in view of the driving system 130 is shown according to some embodiments. More specifically, one example of multi-layered piezoelectric members 132a, b, and d is shown. Referring to member 132a, a plurality of piezoelectric layers 133 is shown with first and second sets of interwoven electrodes 134, 136. The first set of interwoven electrodes 134 are commonly connected to an "L" shaped electrode 134a. Similarly, the second set of interwoven electrodes 136 are commonly connected to an opposing "L" shaped electrode 136a (shown in FIG. 2). The "L" shaped electrode 134a electrically connects the first set of interwoven electrodes 134 to terminal 142, which is electrically coupled to the full bridge drive system 150 via electrical trace 144c. Similarly, the opposing "L" shaped electrode 136a electrically connects the second set of interwoven electrodes 136 to a terminal (not shown in 1B), which is also electrically coupled to the full bridge drive system 150 via electrical trace 144d. The members 132b-d similarly comprise a plurality of piezoelectric layers, a first and second set of interwoven electrodes 134, 136, and "L" shaped electrodes 134b-d, 136b-d, respectively.

According to some embodiments, each of the piezoelectric layers 133 has a thickness T of about fourteen micrometers, although other thicknesses and/or varying thicknesses can be used for each of the piezoelectric layers 133. It is contemplated that the piezoelectric layers 133 can have a thickness T between about five micrometers and about forty micrometers. Using a plurality of thin piezoelectric layers 133 (e.g., about five micrometers thick to about forty micrometers thick) to form each of the members 132a-d allows for a lower voltage to be used than is possible when using a thick monolithic piezoelectric layer (e.g., about two hundred micrometers thick). Specifically, the relatively thinner piezoelectric layers 133 expand and/or contract in the direction along the axis of rotation 125 the same amount when a relatively smaller voltage differential is applied across the thickness T of each piezoelectric layer as compared to a thick monolithic piezoelectric layer. Thus, a multi-layered piezoelectric member (e.g., members 132a-d) can expand and/or contract in the direction along the axis of rotation 125 the same amount as a monolithic piezoelectric member but by applying a smaller voltage differential. For example, a typical prior art monolithic piezoelectric member requires about 40 volts to operate, where multi-layered piezoelectric members (e.g., members 132a-d) require only about 2.8 volts to operate. As will be explained in more detail below, the expansion and/or contraction of the members 132a-d causes the element 110 to bend and/or vibrate. It is these vibrations of the element 110 that linearly drive the threaded shaft 120 and cause the threaded shaft 120 to apply the force to the load.

Referring to FIG. 2, an exploded perspective view of the linear motor system 100 is shown in accordance with some embodiments. The threaded shaft 120 can be screwed into position within the threaded passage of the element 110. A bottom surface of each of the members 132a-d is rigidly attached to a corresponding outer surface of the element 110. It is contemplated that the members 132a-d can be attached to the element 110 using various glues and/or adhesives.

Figure 5:
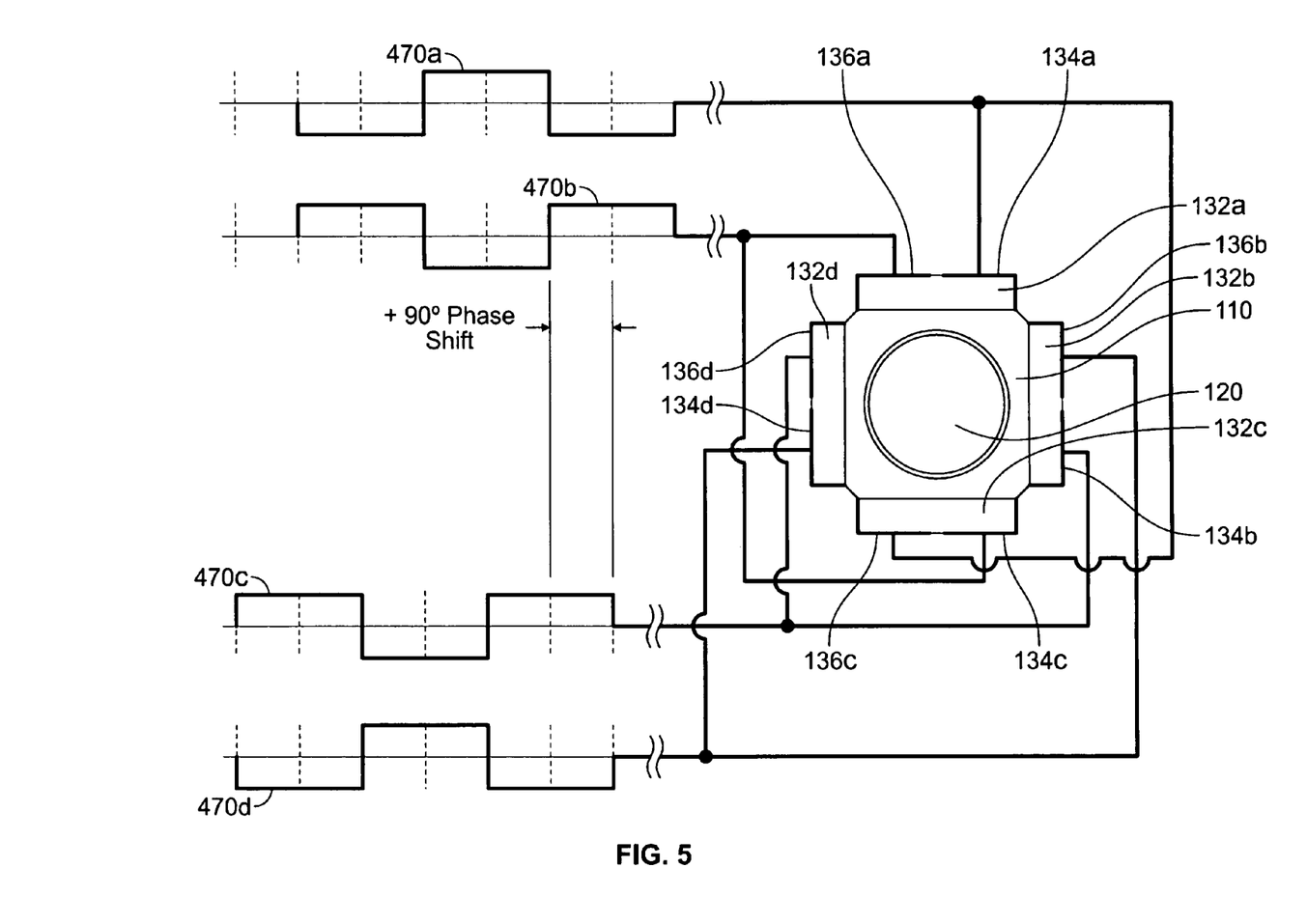
FIG. 5 is a diagram of an example of electrical signals applied by the driving system for driving the linear motor system of FIG. 1A.
Figure 6:
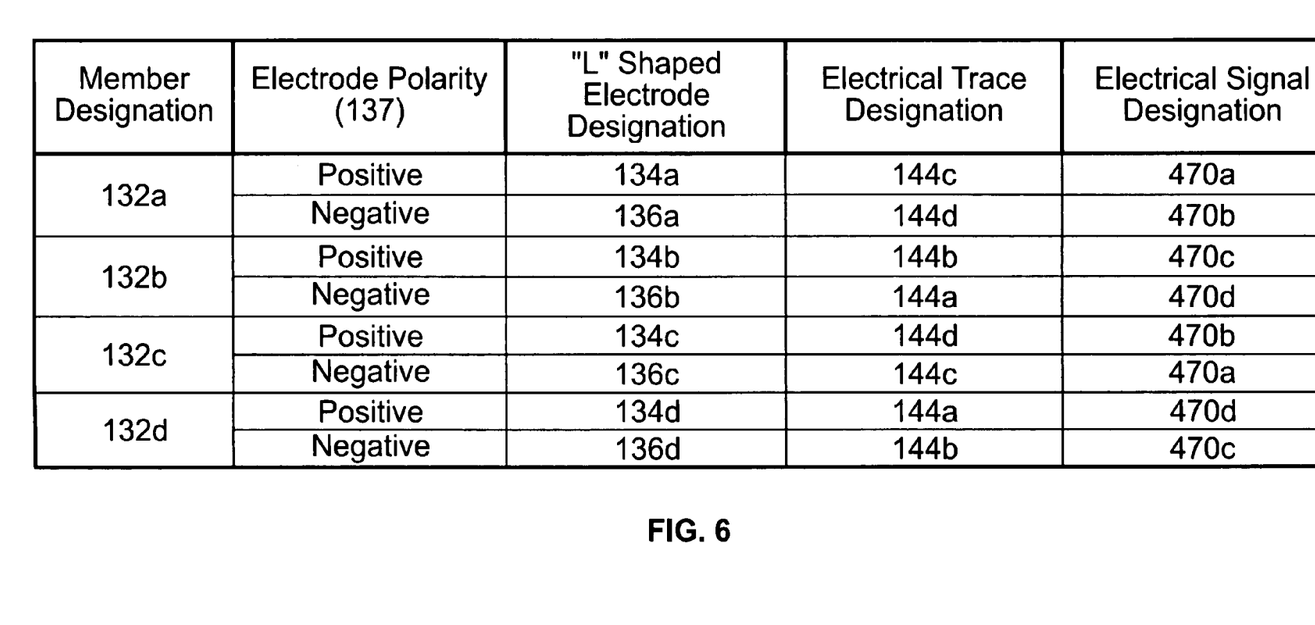
FIG. 6 is a table detailing electrical connections for the linear motor system of FIG. 1A.

The flex circuit 140 is shown in a partially folded position. The flex circuit 140 can be predisposed to bend at certain locations to aid in wrapping the flex circuit 140 around the members 132a-d and the element 110. The flex circuit 140 comprises eight terminals 142 and the four electrical traces 144a-d, which are attached to the four signal outputs 154a-d of the full bridge drive system 150. Each of the electrical traces 144a-d is positioned within various layers of the flex circuit 140 such that each electrical trace 144a-d electrically attaches to two different terminals 142. It is contemplated that in some embodiments, the flex circuit 140 can comprise eight electrical traces, where each of the eight electrical traces electrically attaches to one of the eight terminals 142. In some embodiments, the flex circuit 140 can further include several holes 147 along the predisposed bending lines to further aid in wrapping the flex circuit 140 around the members 132a-d and the element 110. The illustrated paths of the electrical traces 144a-d are by way of example only and not intended to limit the actual layout of the paths of the electrical traces 144a-d. Reference is made to FIGS. 5 and 6 for one example of how to connect the electrical traces 144a-d to the members 132a-d.

Each member 132a-d comprises two "L" shaped electrodes 134a-d and 136a-d, respectively. According to some embodiments, each of the "L" shaped electrodes 134a-d, 136a-d are electrically coupled with a first and second set of interwoven electrodes 134, 136, respectively. The "L" shaped electrodes can be attached to the outer surface of the members 132a-d or can be partially internal. Put another way, the "L" shaped electrodes 134a-d, 136a-d can be fully exposed on one or more of the outer surfaces of the members 132a-d or only partially exposed. However, at least a portion of each of the "L" shaped electrodes 134a-d, 136a-d must be positioned on the members 132a-d such that the "L" shaped electrode 134a-d, 136a-d can be electrically coupled with one of the terminals 142 on the adjacent flex circuit 140. The element 110 includes at least two nodal planes that are perpendicular to the axis of rotation 125 where the members' 132a-d vibration amplitude is minimum for a first bending resonant mode. According to some embodiments, for each of the members 132a-d, one of the terminals 142 is substantially located at each of the two nodal planes of the element 110.

Referring to FIG. 3, a cross-sectional view of member 132a having multiple piezoelectric layers is shown according to some embodiments. Multi-layer piezoelectric members (e.g., members 132a-d) can be fabricated according to any conventional technique, such as described in U.S. Pat. No. 4,523,121 to Takahashi et al. and in Micromechatronics by Kenji Uchino and Jayne R. Giniewicz, chap. 4 (2003) (ISBN: 0-8247-4109-9), or any other suitable technique. The cross-section of members 132b-d are the same as the cross-section of member 132a. Member 132a comprises multiple piezoelectric layers 133, a first set of interwoven electrodes 134, and a second set of interwoven electrodes 136. The first set of interwoven electrodes 134 are electrically connected to "L" shaped electrode 134a. The second set of interwoven electrodes 136 are electrically connected to "L" shaped electrode 136a. The "L" shaped electrodes 134a, 136a are coupled to opposing ends of the member 132a. Other types and numbers of electrodes and/or electrical connections are contemplated.

Each one of the electrodes in the first set of interwoven electrodes 134 is attached to a first surface of a respective piezoelectric layer and a matching one of the electrodes in the second set of interwoven electrodes 136 is attached to a second opposing surface of the same respective piezoelectric layer. For example, electrode 134' and electrode 136' comprise a first matching pair of electrodes that are coupled and/or sandwiched to opposing surfaces of piezoelectric layer 133', which has a thickness T. Each of the "L" shaped electrodes 134a, 136a are coupled to a voltage source 353.

The "L" shaped electrodes 134a, 136a are coupled via flex circuit 140 to the full bridge drive system 150. A voltage differential can be applied across the thickness of the member 132a using the voltage source 353. Specifically, a voltage differential can be applied across the thickness T of each of the piezoelectric layers 133 using the first and second sets of interwoven electrodes 134, 136. According to some embodiments, depending on the orientation of electric dipoles in each of the piezoelectric layers 133, the voltage differential causes each of the piezoelectric layers 133 of the member 132a to expand and/or contract in the direction along the axis of rotation 125.

Each of the members 132a-d (shown in FIG. 2) has a positive and negative polarity 137 that can be created during the manufacturing process by poling. For example, if "L" shaped electrode 134a is positive and "L" shaped electrode 136a is negative, then when a voltage differential is applied between the "L" shaped electrodes 134a and 136a such that the voltage difference between two terminals 353a and 353b of the voltage source 353 is positive, the member (e.g., member 132a-d) will contract and/or shrink. Similarly, when a voltage differential is applied between the "L" shaped electrodes 134a and 136a so that the voltage difference between the two terminals 353a and 353b is negative, the member (e.g., member 132a-d) will expand and/or increase in length. One example of an increase in length of the member 132a from L to L' is illustrated by dotted line 132a'.

Figure 4:
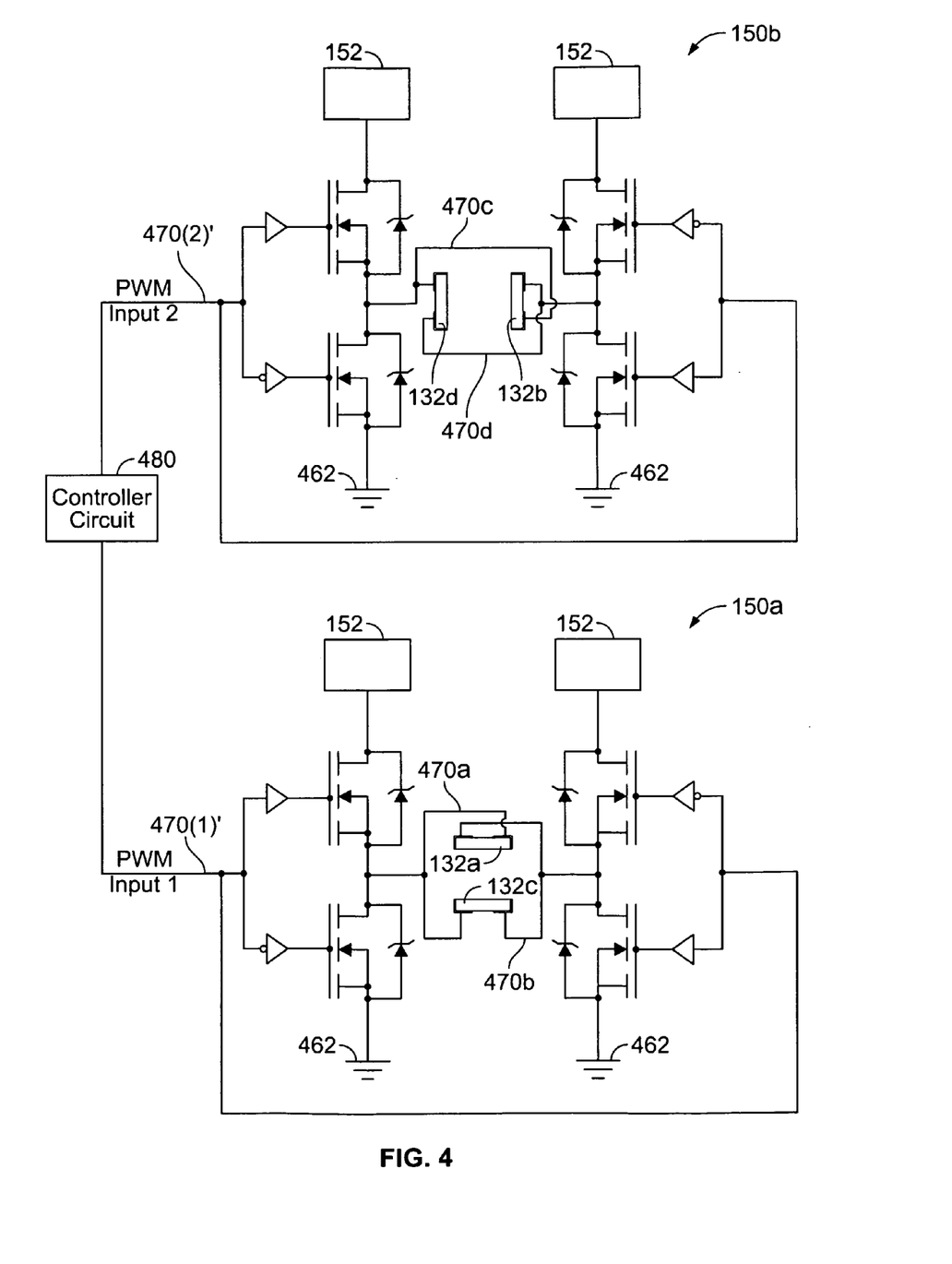
FIG. 4 is a diagram of two full bridge drive system in accordance with embodiments of the present disclosure.

Referring to FIG. 4, a circuit block diagram illustrating a first and second full bridge drive system 150A,B is shown according to some embodiments. The first and second full bridge drive systems 150A,B each include a voltage source 152, which can be a battery in, for example, a cell phone, a camera, or a PDA. According to some embodiments, a controller circuit 480 includes a microcontroller and/or a microprocessor and a phase shifting circuit to generate a first pulse width modulated (PWM) input signal 470(1)' and a second PWM input signal 470(2)'. The controller circuit 480 is configured to phase shift one of the PWM input signals 470(1)', 470(2)' ninety degrees with respect to the other and to transmit the signals 470(1)', 470(2)' to the first and second full bridge drive systems 150A,B. Specifically, the first PWM input signal 470(1)' is transmitted to the first full bridge drive system 150A and the second PWM input signal 470(2)' is transmitted to the second full bridge drive system 150B. According to some embodiments, the phase shifting circuit can be referred to as a limitation circuit.

The first full bridge drive system 150A amplifies and splits the first PWM input signal 470(1)' into a first electrical signal 470A and a second electrical signal 470B. One of the electrical signals 470A,B is phase shifted 180 degrees relative to the other electrical signal to double the effective voltage differential across each of the piezoelectric layers 133 of the members 132a,c. The first and second electrical signals 470A,B are transmitted to members 132a,c via flex circuit 140 to drive the members 132a,c. Similarly, the second full bridge drive system 150B amplifies and splits the second PWM input signal 470(2)' into a third electrical signal 470C and a fourth electrical signal 470D. One of the electrical signals 470C,D is phase shifted 180 degrees relative to the other electrical signal to double the effective voltage differential across each of the piezoelectric layers 133 of the members 132b,d. The third and fourth electrical signals 470C,D are transmitted to members 132b,d via the flex circuit 140 to drive the members 132b,d.

According to some embodiments, using a full bridge drive system 150A,B to transmit the first and second or the third and fourth electrical signals 470A,B, 470C,D to their respective members 132a-d allows for the driving system 130 to be commonly grounded 462. The electrodes 134a-d and 136a-d are floating relative to common ground and are driven independently, which eliminates a need for soldering a common ground wire to the element 110, as is typically required in prior art linear motor systems. Eliminating the common ground wire soldered to the element 110 reduces the time and cost it takes to make a linear motor system, such as the linear motor system 100.

Referring to FIG. 5, the electrical signals 470A-D are illustrated and shown being transmitted to respective members 132a-d. The first electrical signal 470A is a square-wave voltage signal that is about 180 degrees out of phase from the second electrical signal 470B, which is also a square-wave voltage signal. Similarly, the third electrical signal 470C is a square-wave voltage signal that is about 180 degrees out of phase from the fourth electrical signal 470D, which is also a square-wave voltage signal. The first and second electrical signals 470A,B are transmitted through electrical traces 144c,d that are attached via terminals 142 to respective "L" shaped electrodes 134a and 136a on the first member 132a and also to respective "L" shaped electrodes 134c and 136c, on the third member 132c. The third and fourth electrical signals 470C,D are transmitted through electrical traces 144a,b that are attached via terminals 142 to respective "L" shaped electrodes 134b and 136b on the second member 132b and also to respective "L" shaped electrodes 134d and 136d on the fourth member 132d. The "L" shaped electrodes 134a-d and 136a-d shown in FIG. 5 and illustrated in FIG. 4 can be located on longer edges of the members 132a-d and are electrically identical to the "L" shaped electrodes 134a-d and 136a-d shown in FIGS. 1-3.

Referring to FIG. 6, a table detailing one example of electrical connections for members 132a-d is shown. As shown in the table, the members 132a-d each have a positive and a negative polarity 137 such that electrodes 134a-d are positive and electrodes 136a-d are negative.

With reference to FIGS. 5 and 6, according to some embodiments, the first member 132a and third member 132c comprise a first pair of opposing members that operate together; and the second member 132b and fourth member 132d comprise a second pair of opposing members that operate together. The electrical signals 470A,B provided to the first pair of opposing members are phase shifted about 90 degrees relative to the electrical signals 470C,D provided to the second pair of opposing members to cause the threaded shaft 120 to rotate and translate in the direction along the axis of rotation 125. A positive 90 degree phase shift, as shown in FIG. 5, will produce a positive or forward translation of the threaded shaft 120, where a negative 90 degree phase shift will produce a negative or backward translation of the threaded shaft 120. According to some embodiments, the electrical signal's 470A_D frequency is substantially the same as the first bending mode resonance of the motor system 100. While certain electrical signals and phase shifts have been described, it is contemplated that other frequency ranges, shapes, and phase differences of the signals 470A-D are contemplated.

Operation of the linear motor system 100 will now be described with reference to FIGS. 1A,B to 6. As discussed above, the first member 132a and the third member 132c comprise the first pair of opposing members that operate together to bend the element 110 in one direction, as one of the members increases in length and the other member decreases in length when the electrical signals 470A,B are applied. Similarly, the second member 132b and the fourth member 132d are the second pair of opposing members that operate together to bend the element 110 in an orthogonal direction, as one of the members increases in length and the other member decreases in length when the electrical signals 470C,D are applied.

The full bridge drive system 150A receives the first PWM input signal 470(1)', as shown in FIG. 4. The first PWM input signal 470(1)' is split into the electrical signals 470A,B, one being phase shifted 180 degrees relative to the other. Each of the electrical signals 470A,B are amplified using voltage source 152 and transmitted via flex circuit 140 (See FIG. 1A) to the first pair of opposing members. Each of the electrical signals 470A,B are transmitted to two opposing "L" shaped electrodes 134a, 136a and 134c, 136c attached to the members 132a,c (See FIGS. 5-6 for connections). Specifically, the first electrical signal 470A is transmitted to "L" shaped electrodes 134a and 136c and the second electrical signal 470B is transmitted to "L" shaped electrodes 136a and 134c (See FIG. 2 for the orientation of the "L" shaped electrodes).

In relation to FIG. 3, the "L" shaped electrode 134a is electrically coupled with a first set of interwoven electrodes 134 and the "L" shaped electrode 136a is electrically coupled with a second set of interwoven electrodes 136. Similarly, the "L" shaped electrode 134c is electrically coupled with a first set of interwoven electrodes 134 and the "L" shaped electrode 136c is electrically coupled with a second set of interwoven electrodes 136. The "L" shaped electrodes 136a and 134c electrically apply the first electrical signal 470A and the "L" shaped electrodes 134a and 136c electrically apply the second electrical signal 470B to their respective sets of interwoven electrodes 134, 136. Application of the electrical signals 470A,B to the opposing sets of interwoven electrodes creates a voltage differential across each piezoelectric layer 133 in the first and third members 132a,c.

Similar to the full bridge drive system 150A, the full bridge drive system 150B receives the second PWM input signal 470(2)', as shown in FIG. 4. The second PWM input signal 470(2)' is split into the electrical signals 470C,D, one being phase shifted 180 degrees relative to the other. Each of the electrical signals 470C,D are amplified using voltage source 152 and transmitted via flex circuit 140 (See FIG. 1A) to the second pair of opposing members. Each of the electrical signals 470C,D are transmitted to two opposing "L" shaped electrodes 134b, 136b and 134d, 136d attached to the members 132b,d (See FIGS. 5-6 for connections). Specifically, the third electrical signal 470C is transmitted to "L" shaped electrodes 134b and 136d and the fourth electrical signal 470D is transmitted to "L" shaped electrodes 136b and 134d (See FIG. 2 for the orientation of the "L" shaped electrodes).

In relation to FIG. 3, the "L" shaped electrode 134b is electrically coupled with a first set of interwoven electrodes 134 and the "L" shaped electrode 136b is electrically coupled with a second set of interwoven electrodes 136. Similarly, the "L" shaped electrode 134d is electrically coupled with a first set of interwoven electrodes 134 and the "L" shaped electrode 136d is electrically coupled with a second set of interwoven electrodes 136. The "L" shaped electrodes 136b and 134d electrically apply the third electrical signal 470C and the "L" shaped electrodes 134b and 136d electrically apply the fourth electrical signal 470D to their respective sets of interwoven electrodes 134, 136. Application of the electrical signals 470C,D to the opposing sets of interwoven electrodes creates a voltage differential across each piezoelectric layer 133 in the second and fourth members 132b,d.

According to some embodiments that include the full bridge drive system 150, the voltage source 152 is about an 8 volt battery and the effective voltage differential across the thickness T of each piezoelectric layer 133 is about 16 volts. According to some embodiments that include the full bridge drive system 150, the voltage source 152 is about a 2.8 volt battery and the effective voltage differential across the thickness T of each piezoelectric layer 133 is about 5.6 volts. According to some embodiments that include the full bridge drive system 150, the voltage source 152 is about a 2 volt battery and the effective voltage differential across the thickness T of each piezoelectric layer 133 is about 4 volts. It is contemplated that various types of batteries and voltage sources with various voltage outputs may be used in the driving system 130.

As shown in FIG. 5, the electrical signals 470A-D are square-waves with equal amplitude and a ninety degree phase shift between the electrical signals 470A,B and the electrical signals 470C,D to produce a circular orbit. Now referring to FIG. 7, a single orbital cycle of the linear motor system 100 is shown sequentially in ninety degree increments 690, 692, 694, 696, and 698 for one direction of rotation and for the corresponding electrical signal amplitudes.

Figure 7:
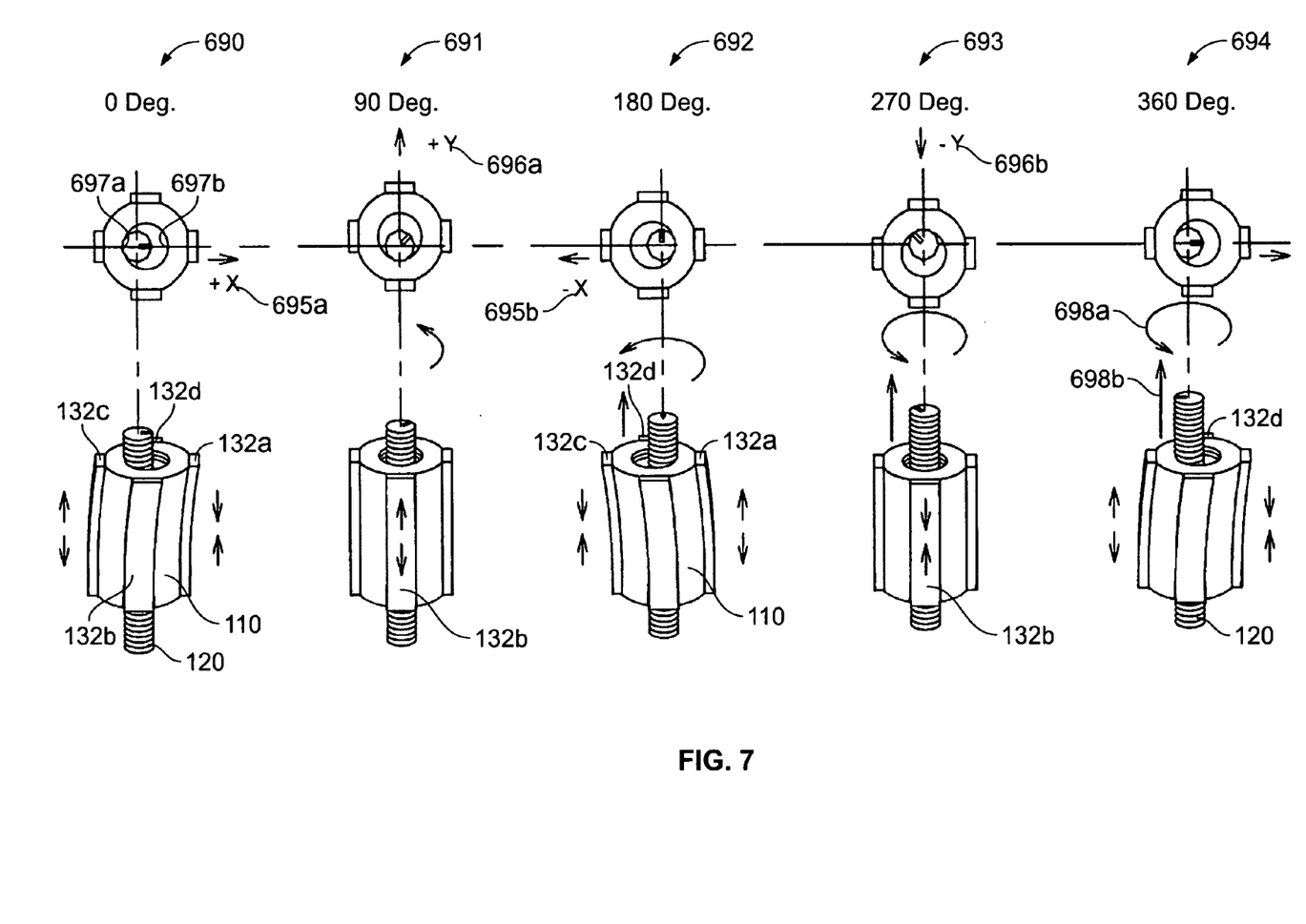
FIG. 7 is a diagram illustrating an exemplary elliptical orbit for the linear motor system illustrated in FIG. 1A.

Referring to the first 90 degree increment 690 at zero degrees, applying the first and second electrical signals 470A,B to the first pair of opposing members, as discussed above, causes member 132c to expand and/or elongate, while member 132a simultaneously contracts. This simultaneous expansion on one side of the element 110 and contraction on an opposite of the element 110, in the direction along the axis of rotation 125, causes the element 110 to bend as shown at the first 90 degree increment 690. The cylindrical bending and orbital movement is shown in the X direction 695a/695b and the Y direction 696a/696b. The element 110 contacts the side of the threaded shaft 120 at one location 697a with a clearance 697b on the opposite side, whereby the contact imparts tangential force and movement that causes the threaded shaft 120 to rotate 698a and translate 698b a small amount for each orbital cycle. The amount of rotation and translation per cycle depends on many factors, including orbit amplitude, the magnitude of force acting on the threaded shaft 120, and the coefficient of friction and surface finish of the threads.

As shown in FIG. 7, the clearance 697b between the element 110 and the threaded shaft 120 is exaggerated to more clearly show the orbital motion of the element 110. According to some embodiments, the amplitude of the orbital motion of the element 110 (the diameter of the orbit) is in the range of about 0.5 micrometers to about 10 micrometers, with the vibration frequency in the range of about 20,000 Hz to about 500,000 Hz, which corresponds to the first bending mode resonance of element 110. The threads of the element 110 and the threads of the threaded shaft 120 mate with a thread clearance being the difference in outside diameter of the threaded shaft 120 and inside diameter of the element 110, which is in the range of about 25 micrometers to about 500 micrometers. According to some embodiments, the force is applied to the round end 122 (shown in FIG. 1A) of the threaded shaft 120 to aid in frictionally coupling the thread faces of the threaded shaft 120 and of the element 110. According to some embodiments, the orbital vibration amplitude generates tangential force on the thread faces of the threaded shaft 120, causing the threaded shaft to rotate and translate. In these embodiments, the orbital vibration frequency is high enough so that the centerline of the threaded shaft 120 remains substantially fixed.

According to some embodiments, for a zero-slip condition between the contact 697a of the element 110 and the threaded shaft 120, the movement of the threaded shaft 120 per cycle is nominally proportional to the orbital vibration amplitude. In general, as the amplitudes of the electrical signals 470A-D increase, the orbit diameter increases, speed increases, and torque/force increases.

There are several advantages to using a reduced-voltage, linear motor system 100. For example, the linear motor system 100 uses two or more piezoelectric layers to reduce the necessary input voltage requirement. Specifically, the reduced-voltage, linear motor system 100 does not require a transformer or a DC-DC boost circuit to step-up or increase an input voltage. In most of the space-sensitive motor systems of the prior art linear motor systems, a typical battery voltage source is about 2.8 volts. However, the prior art linear motor systems require about 40 volts to properly operate the motor. Thus, a transformer and/or a DC-DC boost circuit is required for the motor to operate. Because the prior art linear motor systems are typically used in auto-zoom and auto-focus applications in cell phones, cameras, and PDAs, the inclusion of additional transformer circuitry adds expense, bulk, weight, and takes up space in an otherwise small environment. Thus, the reduced-voltage, linear motor system 100 can operate without additional transformer circuitry and still be used for auto-zoom and auto-focus applications in cell phones, cameras, and PDAs, while taking up a smaller footprint. The above advantages are by way of example only, the reduced-voltage, linear motor system 100 has other advantages, some of which have been described above.

Figure 8:
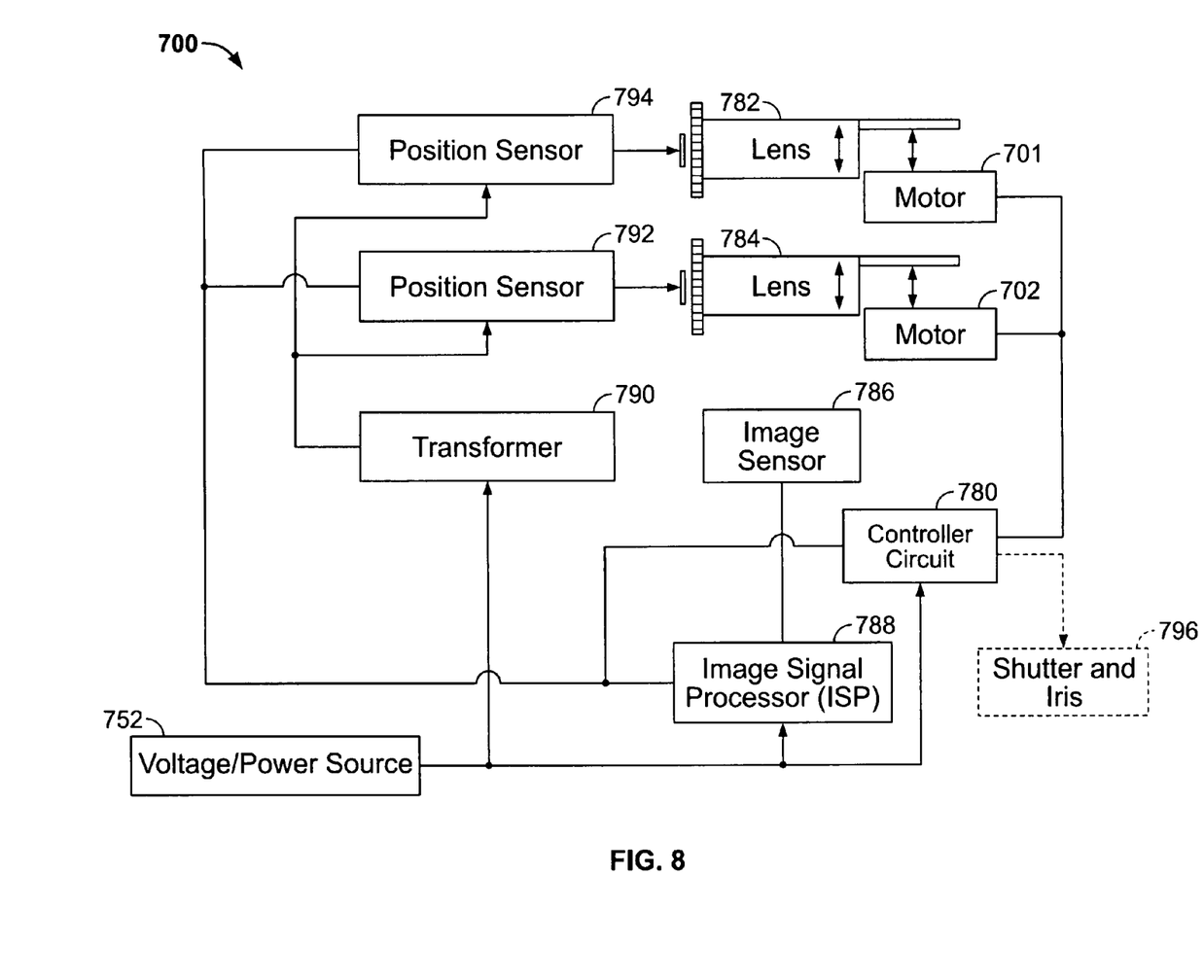
FIG. 8 is a diagram illustrating an optical system with two linear motor systems in accordance with embodiments of the present disclosure.

Referring to FIG. 8, an optical system 700 is shown in accordance with embodiments of the present disclosure. The optical system 700 is used to control and drive lenses 782 and 784 using linear motor systems 701 and 702 respectively. The linear motor systems 701, 702 are the same as, or similar to, the linear motor system 100 described above and shown in FIGS. 1A, 1B, and 2. The optical system 700 includes the linear motor systems 701, 702, a voltage source 752, a controller circuit 780, the lenses 782, 784, an image sensor 786, an image signal processor (ISP) 788, a transformer 790, and position sensors 792, 794. The optical system 700 can optionally include a shutter and an iris 796.

According to some embodiments, the voltage source 752 supplies power to the transformer 790, the image signal processor 788, and the controller circuit 780. The transformer 790 can be used to step-up or increase an input voltage supplied by the voltage source 752 when, for example, the positions sensors 792, 794 require a higher voltage to operate. The controller circuit 780 receives power directly from the voltage source 752 without needing a transformer. The controller circuit 780 controls the linear motor systems 701, 702 individually. The controller circuit 780 can send one or more electrical signals (e.g., electrical signals 470A-D) to the linear motor systems 701, 702 to cause the linear motor systems 701, 702 to adjust the relative positions of lenses 782, 784.

In some embodiments, the lens 782 is an auto-focus lens and the lens 784 is an optical-zoom lens. Each of the lenses 782, 784 comprises a housing with a cover. The cover has an aperture positioned such that the lenses 782, 784 can selectively allow light to enter the housing. According to some embodiments, the controller circuit 780 can open the aperture in the cover by moving and/or adjusting the shutter 796 to thereby allow light to transmit through one or both of the lenses 782, 784. This light is then received in the image sensor 786, which can also be referred to as an optical sensor or a digital image sensor. The image sensor 786 produces data and/or information associated with the received light and transmits that data and/or information to the image signal processor 788 to generate and/or store an image.

According to some embodiments, as the lenses 782, 784 are adjusted by the linear motor systems 701, 702, position sensors 792, 794 monitor and/or track the position of the lenses 782, 784 within the housing and send a position signal to the controller circuit 780. The position signal can be used by the controller circuit 780 to fine-tune positional adjustments to the lenses 782, 784.

Various other applications exist for linear motor systems, such as linear motor systems 100, 701, and 702. For example, several alternative applications for such linear motor systems can be found in U.S. Pat. No. 6,940,209, titled, "Ultrasonic Lead Screw Motor"; U.S. Pat. No. 7,339,306, titled, "Mechanism Comprised of Ultrasonic Lead Screw Motor"; U.S. Pat. No. 7,170,214, titled, "Mechanism Comprised of Ultrasonic Lead Screw Motor"; and U.S. Pat. No. 7,309,943, titled, "Mechanism Comprised of Ultrasonic Lead Screw Motor," all of which are commonly assigned to New Scale Technologies, Inc. and are all hereby incorporated by reference in their entireties.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A linear motor system comprising:
an ungrounded element with a threaded passage;
a threaded shaft with an axis of rotation which extends through and is at least partially engaged with at least a portion of the threaded passage; and
a driving system comprising at least two planar members directly connected to respective outer planar surfaces of the element substantially along a length of the element, each of the two planar members comprises a pair of opposing members, two or more interconnected piezoelectric layers and a first set of interwoven electrodes and a second set of interwoven electrodes which are coupled to opposing surfaces of each of the piezoelectric layers and arranged to extend along the length of the axis of rotation of the shaft, wherein each set of interwoven electrodes is separately coupled to one of the pair of opposing members and the first and second sets of interwoven electrodes are coupled to a full bridge drive system, the planar members are configured to expand and contract in a direction along the axis of rotation, the driving system is configured to subject the element to vibrations causing the threaded shaft to simultaneously rotate and translate in the direction along the axis of rotation through the element and apply an axial force in the direction along the axis of rotation.

2. The system as set forth in claim 1 further comprising a voltage source coupled to the driving system, wherein the voltage source applies an effective voltage differential across each of the piezoelectric layers of about 5.6 volts.

3. The system as set forth in claim 2 wherein the electrodes coupled to the opposing surfaces of each piezoelectric layer apply the voltage differential.

4. The system as set forth in claim 1 further comprising a voltage source coupled to the driving system, wherein the voltage source applies an effective voltage differential across each of the piezoelectric layers, the effective voltage being between about two volts and about sixteen volts.

5. The system as set forth in claim 1 wherein the threaded shaft is operatively connected to a load which is moveable in the direction along the axis of rotation.

6. The system as set forth in claim 5 wherein the load comprises an optical lens.

7. The system as set forth in claim 1 wherein one of the at least two planar members include a first pair of opposing members including a first member and a second member and a second of the at least two planar members include a second pair of opposing members including a third member and a fourth member.

8. The system as set forth in claim 7 wherein the full bridge drive system outputs a first signal to the first set of interwoven electrodes in the first and second members, a second signal to the second set of interwoven electrodes in the first and second members, a third signal to the first set of interwoven electrodes in the third and fourth members, and a fourth signal to the second set of interwoven electrodes in the third and fourth members, the first signal, the second signal, the third signal, and the fourth signal being at least partially out of phase.

9. The system as set forth in claim 8 wherein the first signal is shifted out of phase with respect to the second signal and the third signal is shifted out of phase with respect to the fourth signal to double an effective voltage differential applied across the thickness of each of the piezoelectric layers in each of the members.

10. The system as set forth in claim 1 wherein the two or more piezoelectric layers comprise between about five piezoelectric layers and about twenty-five piezoelectric layers.

11. The system as set forth in claim 1 wherein the two or more piezoelectric layers are about thirteen piezoelectric layers.

12. The system as set forth in claim 1 wherein each of the piezoelectric layers is between about five micrometers thick and about forty micrometers thick.

13. The system as set forth in claim 12 wherein each of the piezoelectric layers is between about ten micrometers thick and about twenty micrometers thick.

14. The system as set forth in claim 1 wherein each of the planar members are between about 150 micrometers thick and about 250 micrometers thick.

15. The system as set forth in claim 1 wherein the element has a square cross-section, an octagonal cross-section, a polygonal cross-section, a circular cross-section, an oval cross-section, or any combination thereof.

16. An optical lens assembly, comprising:
a linear motor system comprising:
an ungrounded element with a threaded passage;
a threaded shaft with an axis of rotation which extends through and is at least partially engaged with at least a portion of the threaded passage; and
a driving system comprising at least two planar members directly connected to respective outer planar surfaces of the element substantially along a length of the element and subject the element to vibrations causing the threaded shaft to simultaneously rotate and translate in a direction along the axis of rotation through the element and apply an axial force in the direction along the axis of rotation, each of the at least two planar members comprises a pair of opposing members, two or more interconnected piezoelectric layers and at least two interwoven electrodes which are coupled to opposing surfaces of each of the piezoelectric layers wherein each set of interwoven electrodes is separately coupled to one of the pair of opposing members and the first and second sets of interwoven electrodes are coupled to a full bridge drive system and arranged to extend along the length of the axis of rotation of the shaft, which are configured to expand and contract in the direction along the axis of rotation; and an optical lens coupled to the linear motor system;

wherein the linear motor system is configured to move the optical lens in a direction substantially parallel with the direction along the axis of rotation.

17. The assembly as set forth in claim 16 further comprising a housing having a cover, the cover having an aperture positioned to allow light into the housing, the optical lens being located within the housing.

18. The assembly as set forth in claim 17 further comprising an optical sensor positioned within the housing to receive light transmitted through the aperture and through the optical lens.

19. The assembly as set forth in claim 18 wherein the optical sensor is a digital image sensor.

20. The assembly as set forth in claim 16 wherein the optical lens assembly is configured to be mounted within at least one of a camera, a mobile phone, and a PDA.

21. The assembly as set forth in claim 17 further comprising a controller circuit configured to control movement of the threaded shaft in the direction along the axis of rotation.

22. The assembly as set forth in claim 21 further comprising a position sensor, the position sensor configured to track a location of the optical lens within the housing, the position sensor coupled to the controller circuit, the controller circuit configured to move the linear motor system at least in part based on position information received from the position sensor.

23. The assembly as set forth in claim 18 further comprising an image signal processor coupled to the optical sensor, the image signal processor configured to receive information from the image sensor.

24. A method for driving a load, the method comprising:
operatively connecting a load to a threaded shaft which has an axis of rotation and which extends through and is at least partially engaged with at least a portion of a threaded passage in an ungrounded element; and subjecting and at least two planar members which are configured to expand and contract in the direction along the axis of rotation and which are directly connected to respective outer planar surfaces of the element substantially along a length of the element to vibrations causing the threaded shaft to simultaneously rotate and translate in a direction along an axis of rotation through the element which moves the load, each of the two planar members comprises a pair of opposing members, two or more interconnected piezoelectric layers and at least two interwoven electrodes which are coupled to opposing surfaces of each of the piezoelectric layers wherein each set of interwoven electrodes is separately coupled to one of the pair of opposing members and the first and second sets of interwoven electrodes are coupled to a full bridge drive system and arranged to extend along the length of the axis of rotation of the threaded shaft.

25. The method as set forth in claim 24 wherein the load is an optical lens.

26. The system as set forth in claim 8, wherein each one of the electrodes in the first set of interwoven electrodes is attached to a first surface of a respective piezoelectric layer and a matching one of the interwoven electrodes in the second set of interwoven electrodes is attached to a second opposing surface of the same respective piezoelectric layer.

27. The system as set forth in claim 8, wherein each one of the electrodes in the first set of interwoven electrodes extends from the first opposing member terminating short of the second opposing member and each one of the electrodes in the second set of interwoven electrodes extends from the second opposing member terminating short of the first opposing member.

28. The system as set forth in claim 8, wherein the first signal, the second signal, the third signal, and the fourth signal are independently transmitted to the corresponding first, second, third and fourth members via a flex circuit.

29. The system as set forth in claim 28, wherein the flex circuit comprises at least a first pair of opposing electrodes including a first electrode and a second electrode and a second pair of opposing electrodes including a third electrode and a fourth electrode.

30. The system as set forth in claim 29, wherein the flex circuit is configured to wrap around the ungrounded element with a threaded passage such that the first pair of opposing electrodes align with and electrically couple to the first pair of opposing members and the second pair of opposing electrodes align with and electrically couple to the second pair of opposing members.

* * * * *